US006137501A

United States Patent [19]

Wen et al.

[11] Patent Number: 6,137,501

[45] **Date of Patent: *Oct. 24, 2000**

[54] ADDRESSING CIRCUITRY FOR MICROFLUIDIC PRINTING APPARATUS

[75] Inventors: Xin Wen; David A. Johnson, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,116

[22] Filed: Sep. 19, 1997

[51] Int. Cl.[7] ..................... G01D 15/16

[52] U.S. Cl. ..................... 346/140.1

[58] Field of Search ..................... 346/140.1; 347/5, 347/6, 20, 50, 58

[56] References Cited

U.S. PATENT DOCUMENTS 4,042,937 8/1977 Perry et al. .................... 347/89
5,259,737 11/1993 Kamisuki et al. .................... 347/1
5,605,750 2/1997 Romano et al. .
5,611,847 3/1997 Guistina et al. .................... 106/31.43
5,771,810 6/1998 Wolcott .................... 347/43

OTHER PUBLICATIONS

"Electroosmosis: A Reliable Fluid Propulsion System for Flow Injection Analyses", Anal.Chem. 66, pp. 1792–1798 (1994).

*Primary Examiner*—N. Le
*Assistant Examiner*—Lamson D. Nguyen
*Attorney, Agent, or Firm*—Raymond L. Owens

[57] ABSTRACT

A microfluidic printing apparatus responsive to an image file for printing a plurality of pixels on a receiver. The apparatus includes a plurality of colorant delivery chambers which contain colorants having mobile ions; and channels for delivering colorants to each colorant delivery chamber. A structure for colorant delivery is connected to the channels for controlling the amount of colorants delivered to the colorant delivery chambers. Electric drivers associated with the microfluidic pumps and the microvalves and which operate the microvalves and the microfluidic pumps for delivering the colorant to the colorant delivery chambers.

8 Claims, 7 Drawing Sheets

ADDRESSING CIRCUITRY FOR MICROFLUIDIC PRINTING APPARATUS

CROSS REFERENCE TO RELATED APPLICATIONS

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing" U.S. patent application Ser. No. 08/868,100, filed Jun. 3, 1997 entitled "Improved Image Producing Apparatus for Uniform Microfluidic Printing"; U.S. patent application Ser. No. 08/868,416, filed Jun. 3, 1997 entitled "Microfluidic Printing on Receiver"; U.S. patent application Ser. No. 08/868,102, filed Jun. 3, 1997 entitled "Microfluidic Printing With Ink Volume Control"; U.S. patent application Ser. No. 08/868,477, filed Jun. 3, 1997 entitled "Microfluidic Printing With Ink Flow Regulation"; and U.S. patent application Ser. No. 08/872,909, filed Jun. 11, 1997 entitled "Contact Microfluidic Printing Apparatus". The disclosure of these related applications is incorporated herein by reference.

FIELD OF THE INVENTION

The present invention relates to the field of microfluidic printing.

BACKGROUND OF THE INVENTION

A microfluidic printing apparatus delivers colorant to form color pixels on a receiver in an image-wise fashion. A print head may comprise a plurality of colorant delivery nozzles. To reproduce a high quality color image, it is essential for the colorant delivery nozzles to deliver the correct amount of colorants to each color pixel on the receiver according to the pixel values of the input digital image. Failures to do so will produce errors in the optical densities and color balances, and image defects in the printed image.

Another problem in microfluidic printing apparatus is the crosstalk between colorant delivery nozzles. Crosstalk refers to the fact that the colorant delivery in one nozzle is affected by the other nozzles in the microfluidic printing apparatus. The crosstalk can be caused through the electric circuit that controls or drives the colorant delivery. The crosstalk often produces decreased sharpness and other image artifacts in the printed and displayed images. A related phenomena to the crosstalk problem is parasitic effect. The parasitic effect refers to the problem that the electric voltage applied to the colorant delivery means for one nozzle is dependent on the loads on the remaining portion of the electric circuit. The parasitic effect often produces banding image defects.

SUMMARY OF THE INVENTION

An object of this invention is to provide a high quality reproduction of digital images.

Another object of this invention is to provide an image display or print with reduced image defects and improved color balance.

Yet another object of the present invention is to accurately control the colorant delivery for forming an image display or print.

Still another object of the present invention is to reduce electric crosstalk between different colorant delivery nozzles in a microfluidic printing apparatus.

These objects are achieved by a microfluidic printing apparatus responsive to an image file for printing a plurality of pixels on a receiver, comprising:

a) a plurality of colorant delivery chambers;

b) channels for delivering colorants to each colorant delivery chamber;

c) colorant delivery means connected to the channels for controlling the amount of colorants delivered to the colorant delivery chambers including i) a microfluidic pump and a corresponding microvalve associated with each channel for controlling the flow of colorant through the channel to corresponding colorant delivery chambers; and ii) electric drivers which operate the microfluidic pumps and the microvalves.

ADVANTAGES

A feature of the present invention is that the addressing and driving circuit can be fabricated with existing microfabrication technology.

Another feature of the present invention is that the amount of the colorant delivered to each colorant delivery chamber can be individually controlled.

Still another feature of the present invention is that the addressing and driving circuits can be used for driving microfluidic pumps as well as colorant flow regulators.

DETAILED DESCRIPTION OF THE INVENTION

The present invention is described in relation to a microfluidic printing apparatus which can print computer generated digital images.

Figure 1:
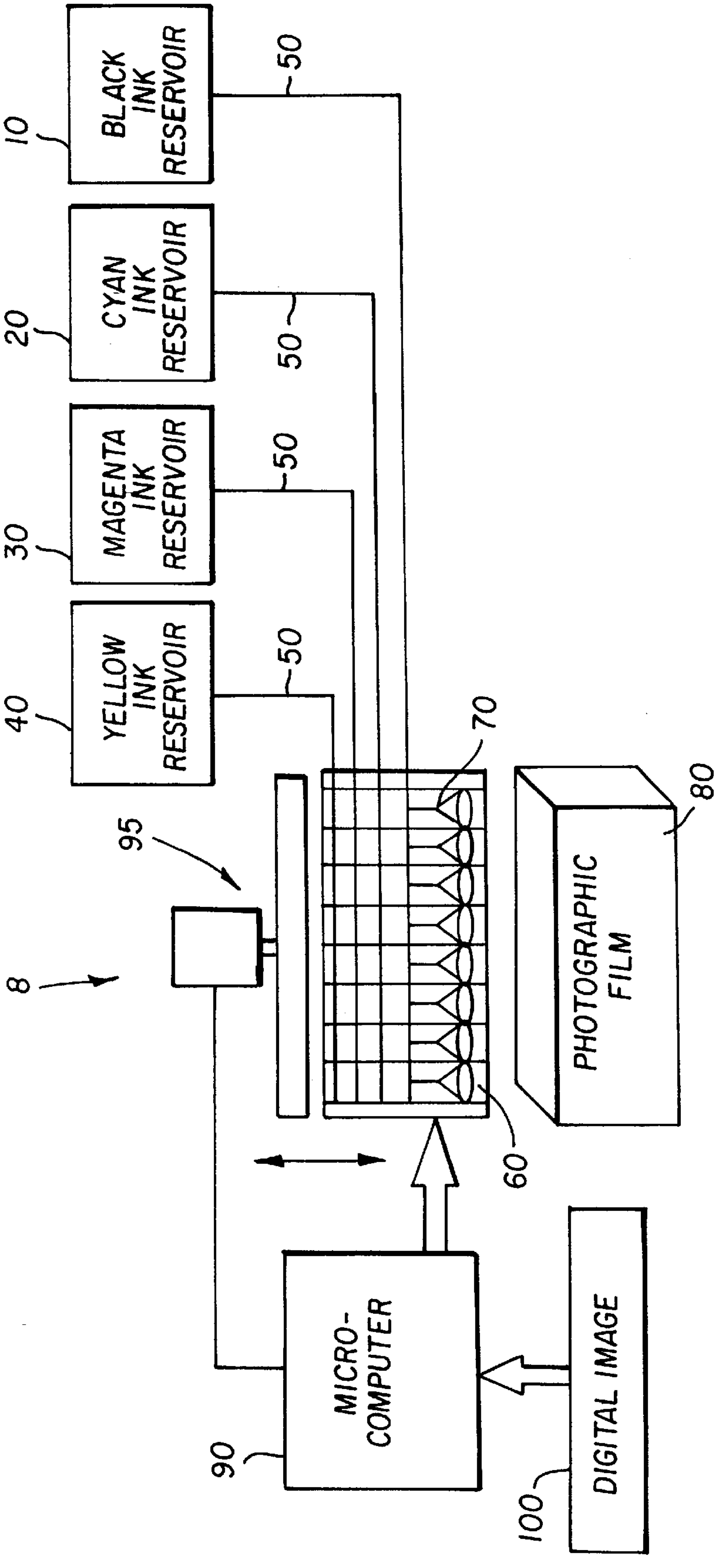
FIG. 1 is a partial schematic showing a microfluidic printing apparatus in the present invention.

Referring to FIG. 1, a schematic diagram is shown of a microfluidic printing apparatus 8 in accordance with the present invention. Reservoirs 10, 20, 30, and 40 are respectively provided for storing black, cyan, magenta, and yellow solutions. The microfluidic printing apparatus can comprise fewer or more than four colorant reservoirs to include other colors such as red, green and blue, and/or the same colorant at different concentrations. A colorless fluid can also be mixed with the colorants to generate a continuous tone in the final printed and displayed image. Microchannel capillaries 50 respectively connected to each of the reservoirs conduct colorant or solutions from the corresponding reservoir to an array of colorant delivery chambers 60. The colorants are delivered to the colorant delivery chambers 60 by microfluidic pumps. The example of the microfluidic pump used in the present invention is the electrokinetic pumps 70, also known as an electroosmotic pumps, which is shown in detail in FIG. 3. The present invention is also compatible with other types of microfluidic pumps such as piezoelectric micropumps, peristaltic micropumps, piston pumps, and gas pressurized pumps. Details about these microfluidic pumps are described, for example, in "Electroosmosis: A Reliable Fluid Propulsion System for Flow Injection Analyses", Anal. Chem. 66, pp. 1792–1798 (1994). In FIG. 1, electrokinetic pumps 70 are shown only for the black colorant channel. Similar pumps are used for the other colorant channels, but are omitted in FIG. 1 for clarity. The amount of each colorant being delivered is controlled by microcomputer 90 according to the digital image 100. The digital image can be reproduced on the receiver 80 in black or colors, or can be viewed directly as a display. For generating a printed image, the microfluidic printing apparatus 8 is transported by a transport mechanism 95 in the direction as indicated by the double arrow in FIG. 1 to come in contact with the receiver 80.

In the present invention, the colorant delivery chambers 60 deliver the colorant directly to a receiver 80 as shown in FIG. 1; however, other types of colorant delivery arrangements can be used such as microfluidic channels, and so when the word chamber is described, it will be understood to include those arrangements. Details about microfluidic printing including microchannels, fluid delivery chambers, and microfluidic pumps are described in the above referenced, commonly assigned U.S. Patent Applications, which can also be used in the present invention.

The receiver 80 in the present invention can be both reflective or transparent. The receiver 80 can be common paper having sufficient fibers to provide a capillary force to draw the ink from the mixing chambers into the paper. Synthetic papers may also be used. The receiver 80 can have a coated layer of polymer which has a strong affinity, or mordanting effect on the ink. For example, if a water based ink is used, a layer of gelatin will provide an absorbing layer for the ink. In one example of an embodiment of the present invention, the receiver 80 is disclosed in U.S. Pat. No. 5,605,750, by Romano, Bugner, and Ferrar, hereby incorporated by reference. The receiver 80 also includes physical articles such as self-adhesive stickers, books, files, and passports, card stock, packaging boxes, envelopes, boxes, packages, and so on. The outside surface of a film carton is shown as receiver 80 in FIG. 1 for illustration. Finally, colorants are transferred to a receiver 80 to reproduce input digital image 100 on the receiver 80.

The colorants used in this invention can be dispersions of dyes or pigments in aqueous solutions or solvents. Examples of such inks are found is U.S. Pat. No. 5,611,847 by Gustina, Santilli, and Bugner. Inks are also be found in the following commonly assigned U.S. patent application Ser. No. 08/699,955, filed Aug. 20, 1996 entitled "Cyan and Magenta Pigment Set"; U.S. patent application Ser. No. 08/699,962, filed Aug. 20, 1996 entitled "Magenta Ink Jet Pigment Set"; U.S. patent application Ser. No. 08/699,963, filed Aug. 20, 1996 entitled "Cyan Ink Jet Pigment Set", all by McInerney, Oldfield, Bugner, Bermel, and Santilli; and in U.S. patent application Ser. No. 08/790,131, filed Jan. 29, 1997 entitled "Heat Transferring Inkjet Ink Images" by Bishop, Simons, and Brick; and U.S. patent application Ser. No. 08/764,379, filed Dec. 13, 1996 entitled "Pigmented Inkjet Inks Containing Phosphated Ester Derivatives" by Martin, the disclosures of which are incorporated by reference herein. Colorants such as the Ciba Geigy Unisperse Rubine 4BA-PA, Unisperse Yellow RT-PA, and Unisperse Blue GT-PA are also preferred embodiments of the invention.

Figure 2:
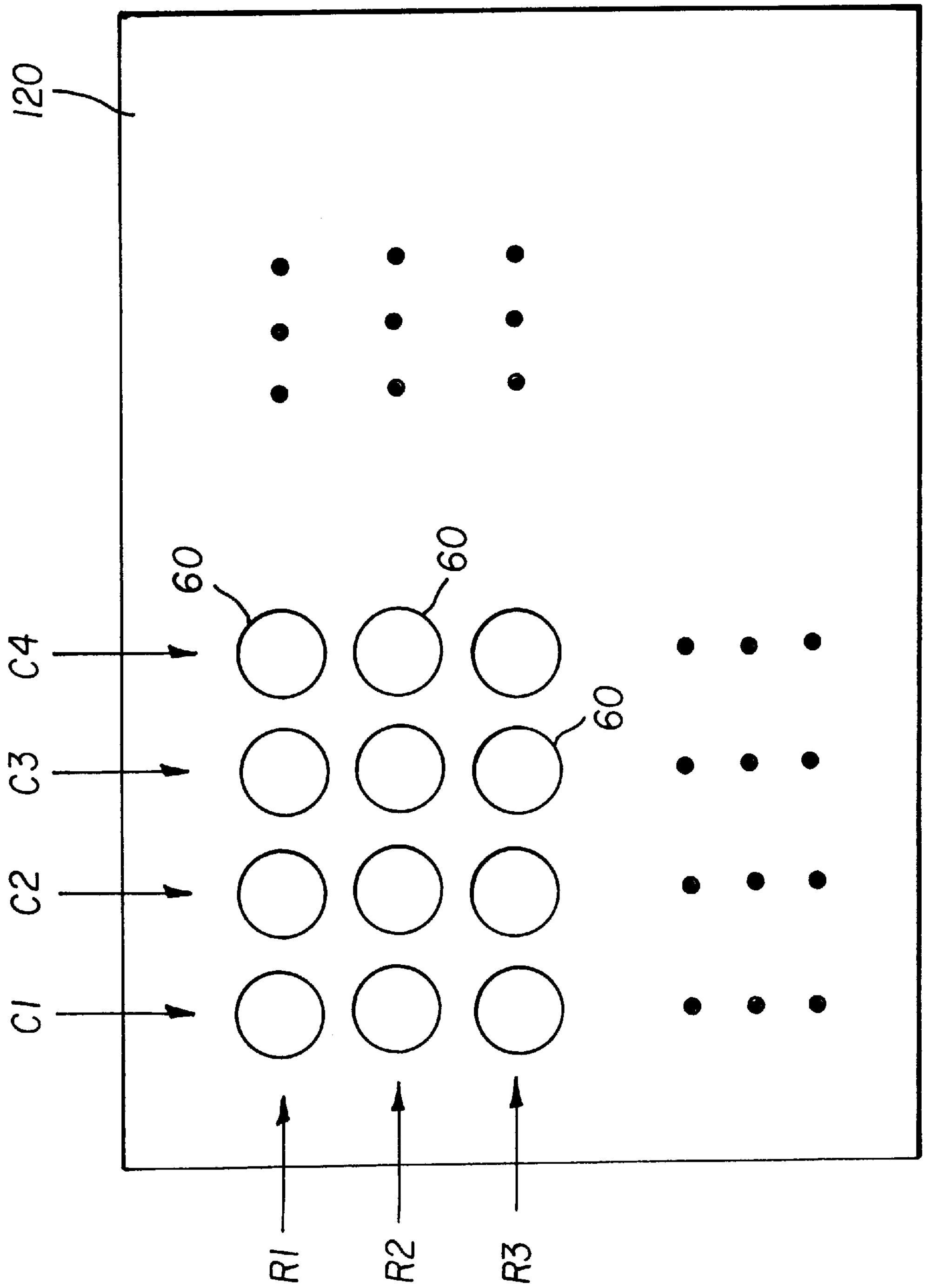
FIG. 2 illustrates a top view of the pattern of colorant delivery chambers in the microfluidic printing apparatus.

FIG. 2 depicts a top view of the arrangement of colorant delivery chambers 60, as shown in FIG. 1, located within a front plate 120 of the microfluidic printing apparatus. Each colorant delivery chamber 60 is capable of receiving a single colorant such as black, yellow, magenta, or cyan, or producing a mixture of colorants having any color saturation, hue and lightness within the color gamut provided by the set of colorant solutions used in the apparatus. The colorant delivery chambers 60 are laid out in rows and columns. The rows are labeled as R1, R2, R3 . . . and so on. The columns are labeled as C1, C2, C3 . . . and so on. Each colorant delivery chamber is located by its row and column numbers. The front plate 120 comprises a total of M rows and N columns.

Figure 3:
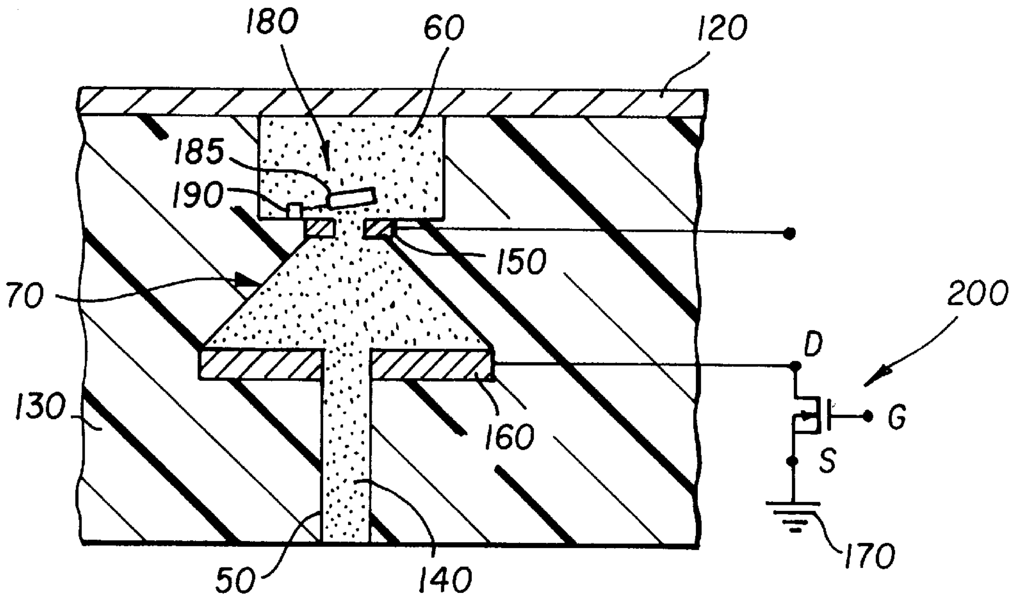
FIG. 3 is a cross-sectional view of a colorant delivery chamber comprising a electrokinetic pump and an electric driving circuit in the present invention.

FIG. 3 shows a cross-sectional view of a colorant delivery chamber 60 in the present invention. A microchannel 50, a colorant delivery chamber 60 and an electrokinetic pump 70 are fabricated in a substrate 130, which can be made of silicon, for example. The colorant 140 is pumped to the colorant delivery chamber 60 by the electrokinetic pump 70 that comprises a top electrode 150 and a lower electrode 160. The flow of the colorant to the colorant delivery chamber 60 can be regulated by different regulation means as disclosed in the above referenced U.S. patent application Ser. No. 08/868,102, filed Jun. 3, 1997 entitled "Microfluidic Printing With Ink Volume Control", U.S. patent application Ser. No. 08/868,477, filed Jun. 3, 1997 entitled "Microfluidic Printing With Ink Flow Regulation". In FIG. 3, a microvalve 180 is shown that is controlled by two electrodes 185 and 190. Details and types of microvalves are also disclosed in the above U.S. patent applications. An electric driver 200 is shown to be connected to the electrokinetic pump 70. But the same driving and addressing approaches as described below are also applicable to the microvalve 180. The electric driver 200 in FIG. 3 is exemplified by an Metal-Oxide Semiconductor field-effect transistor (MOSFET) as a preferred embodiment in the present invention. Specifically, the MOSFET in FIG. 3 is a N-channel enhanced mode MOSFET. It should be noted that other devices such as bipolar junction transistors (BJT's) can also be used in the present invention. In FIG. 1, the source, gate, and drain of the MOSFET are labeled as "S", "G", and "D", respectively. The source "S" of the MOSFET electric driver is connected to ground 170. The MOSFET can be fabricated in a silicon based substrate 130 using Complementary Metal-Oxide Semiconductor (CMOS) technology. A preferred CMOS technology for fabricating the MOSFET in the present invention is double-diffused MOS or DMOS field-effect transistor. The DMOSFET configuration can provide wider operating voltage range at the drain "D" of the electric driver 200 in FIG. 3, which provides wider range of electric-field strength between the top electrode 150 and the lower electrode 160. The top electrode of the electrokinetic pump is connected to an electrode that is controlled as described below. The lower electrode 160 of the electrokinetic pump 70 is connected to the drain "D" of the MOSFET. The electric potential at the gate "G" of the MOSFET can be separately controlled. The voltages at 150 and the "G" controls the electric field strength and thus the pump rate between the top electrode 150 and the lower electrode 160 in the electrokinetic pump 70. For clarity in FIG. 3, only one microchannel 50 and one electrokinetic pump 70 are shown to be connected to the colorant delivery chamber 60. It is understood that several colorants can be delivered by respective electrokinetic pumps 70 to a colorant delivery chamber 60 to form a colorant mixture. The electric driving circuit shown in FIG. 3 can be easily adapted to the such a configuration.

It is also understood that an electric driving circuit can also be easily adapted to drive colorant flow regulation means such as microvalves in a microfluidic printing apparatus. The colorant regulation means are disclosed in above referenced commonly assigned U.S. patent applications Ser. No. 08/868,102, filed Jun. 3, 1997 entitled "Microfluidic Printing With Ink Volume Control" and Ser. No. 08/868,477, filed Jun. 3, 1997 entitled "Microfluidic Printing With Ink Flow Regulation".

Figure 4:
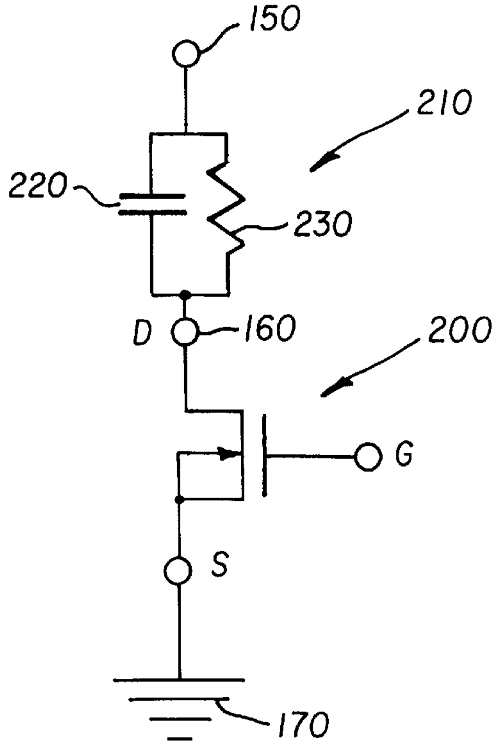
FIG. 4 is an equivalent circuit for the electric driving circuit for the electrokinetic pump in FIG. 3.

FIG. 4 illustrates the equivalent electric circuit of the electric driving circuit for the electrokinetic pump 70 in FIG. 3. The equivalent impedance 210 of an electrokinetic pump 70 comprises a parallel circuit of a capacitor 220 and a resistor 230. The capacitor 220 represents the dielectric nature of the colorant 140. The resistor 230 indicates the leakage current due to the ionic flux in the colorant fluid under an electric field, which is a form of energy dissipation in the electrokinetic pump 70. The voltage applied to the equivalent impedance 210 corresponds to the electric field across the top and the bottom electrodes 150,160 in an electrokinetic pump 70, which determines the pump rate of the electrokinetic pump 70. The amount of colorant delivered by the electrokinetic pump 70 increases with the increased temporal duration of the applied electric field.

Figure 5:
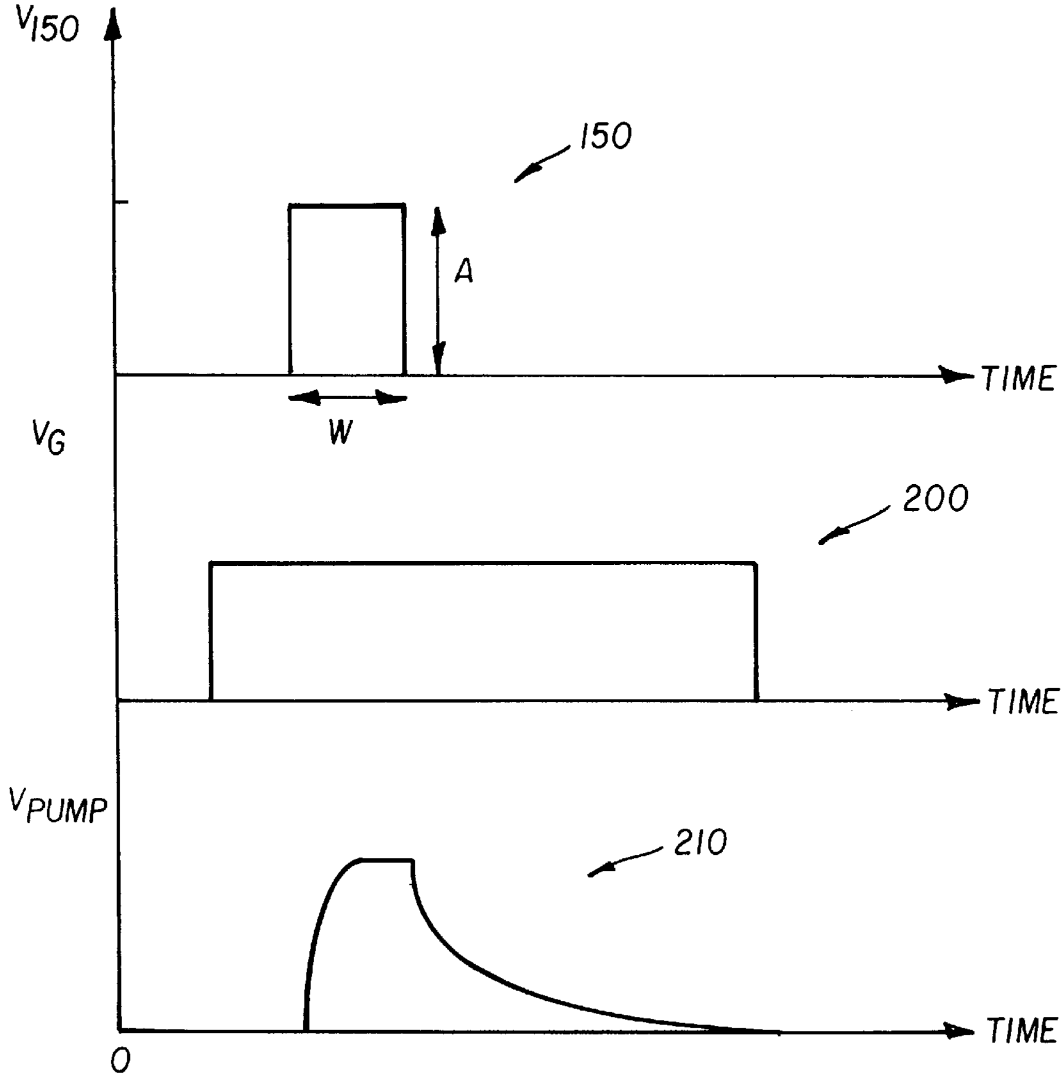
FIG. 5 illustrates the electric waveform driving an electrokinetic pump.

FIG. 5 illustrates the voltage waveforms at the top electrode 150, the gate "G" of the MOSFET electric driver 200, and across the impedance 210. The gate voltage "$V_G$" is raised by an electric pulse which switches on the MOSFET driver. Within the time of the above electric pulse, an electric pulse of width "W" and voltage amplitude "A" is applied to the top electrode 150. The resulted voltage waveform across the impedance 210 is also shown. The characteristic rise time for the pulse is the capacitance of the capacitor 220 multiplied by the on-resistance in the MOSFET 200. The decay time trailing the pulse is determined by the product of the capacitance of the capacitor 220 and the resistance of the resistor 230. The peak value in the voltage waveform across impedance 210 is the amplitude "A" at the top electrode 150 minus the voltage drop across the MOSFET in the on-state. Thus "A" is the primary means to determine the pump rate of the electrokinetic pump 70. The amount of colorant pumped increases with the increased width of the pulse "W". Although digital waveforms are shown for controlling the electrokinetic pumps, the addressing circuit in the present invention is also compatible with analog or pulsed DC waveforms. The amount of the colorant fluids pumped directly corresponds to the pixel values at the respective pixels in the digital image 100.

The microfluidic printing apparatus 8 in the present invention can include a plurality of colorant delivery chambers 60 with respective electric drivers 200. These electric drivers can be addressed in different configurations. In the first embodiment of the present invention, a common ground electrode is connected to the sources "S" of the MOSFET electric drivers. The positive voltage to the top electrodes 150 and the voltage at the gate "G" of each MOSFET electric driver 200 are separately controlled for each individual electrokinetic pump 70. In this embodiment, there are total of (M×N) electric drivers (assuming one electrokinetic pump per colorant delivery chamber 60). The total number of conducting wires is two multiplied by the total number of colorant delivery chambers (M×N), plus the two common electrodes. In this and the following embodiments, it is understood that when there are more than one electrokinetic pumps connected with each colorant delivery chamber, the number of drivers and conducting wires will be increased by a factor of the number of pumps per chamber. One advantage of this embodiment is that any number or all the electric drivers 200 can be activated at the same time for rapid colorant delivery.

Figure 6:
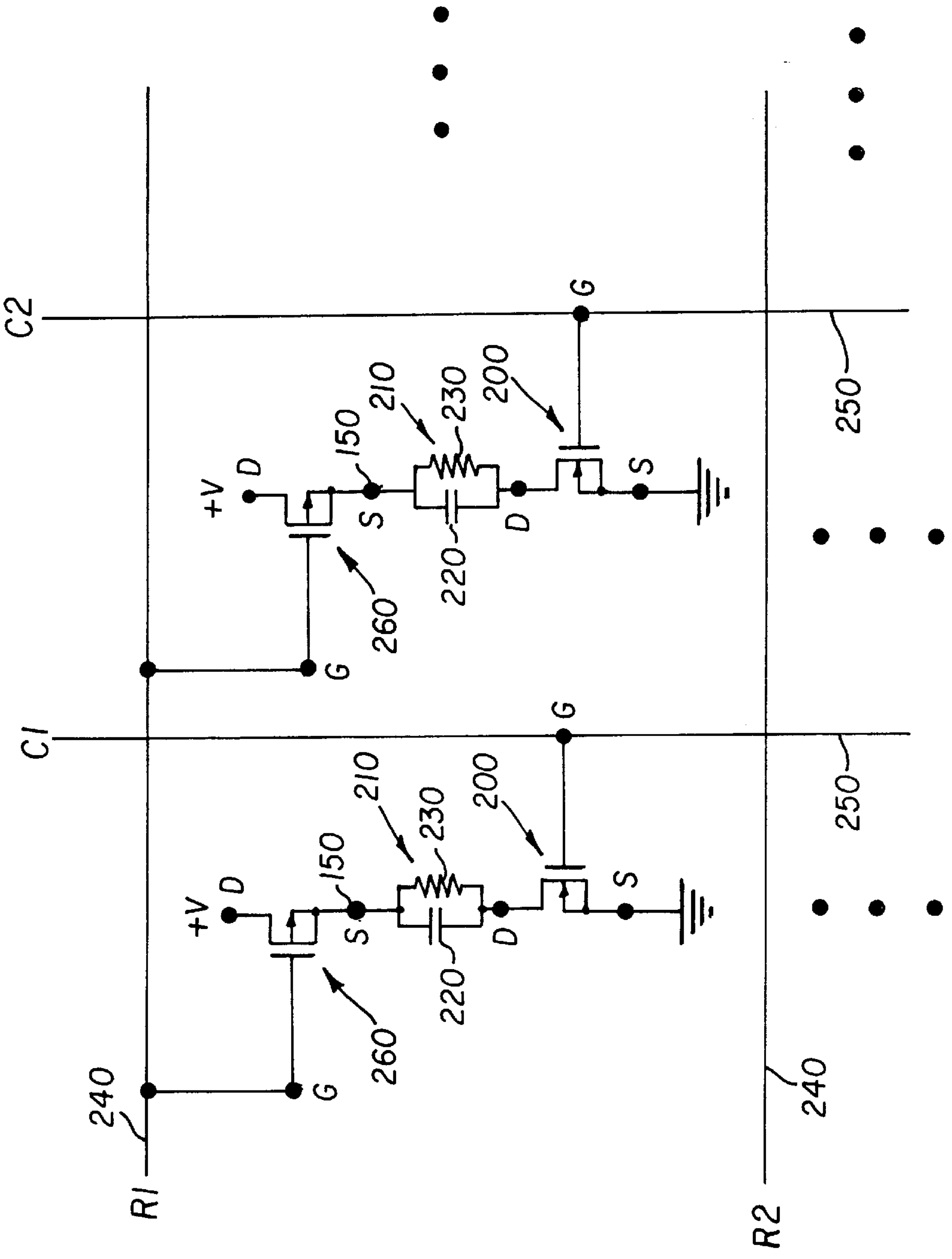
FIG. 6 illustrates the addressing circuit in the second embodiment of the present invention.

The second embodiment of the addressing circuit for electrokinetic pumps in the present invention is illustrated in FIG. 6. Common row electrodes 240 are connected to the gate terminals of p-channel MOSFETs 260 that have their source connected to the top electrodes of the electrokinetic pumps 70 in each row. The common column electrodes 250 are connected to the gate terminals of the n-channel MOSFETs in each column. The electrokinetic pumps in the two dimensional array of colorant delivery chambers are activated sequentially or in parallel. In the sequential approach, the electric pump at row (i) and column (j) is activated by controlling only the (ith) p-channel MOSFET and the (jth) n-channel MOSFET to low impedance states. The control voltages for the remaining rows and columns maintain the corresponding MOSFET drivers in a high impedance state. Since the electrokinetic pump is activated only when both row and column MOSFETs are activated, only the electrokinetic pump at (ith) row and the (jth) column is activated. The electric waveforms (shown in FIG. 5) for driving each N-channel MOSFET of an electrokinetic pump is controlled to deliver the correct amount of colorant fluid to the corresponding colorant delivery chamber according to the input digital image 100. The electrokinetic pumps 70 can also be activated a row (or a column) at a time. For example, when the drivers 260 at row R1 are activated, drivers 200 at different columns can be activated for different lengths of time as illustrated in FIG. 5 so that the amount of colorant delivered at each pump corresponds to the input digital image 100. Since the gate input impedance on MOSFET drivers are very high, the drive currents required for the row electrodes 240 and the column electrodes 250 are essentially independent of the number of electric drivers 200,260 that are activated. The parasitic effects are minimized. In this embodiments, there are total of (2×M×N) electric drivers and (M+N+2) conducting wires for addressing the electrokinetic pumps 70 (assuming one electrokinetic pump per colorant delivery chamber 60).

Figure 7:
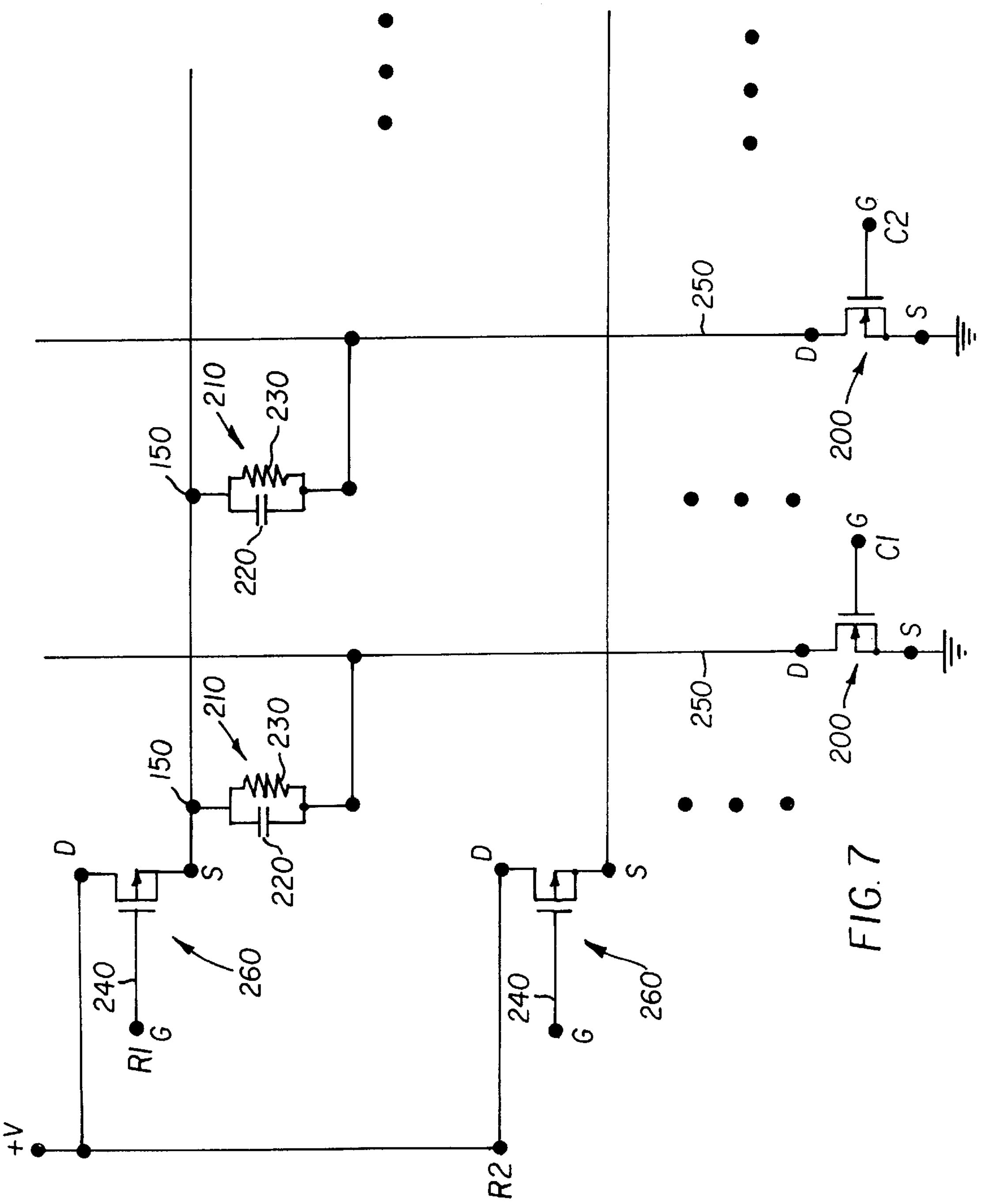
FIG. 7 illustrates the addressing circuit in the third embodiment of the present invention.

The third embodiment of the addressing circuit in the present invention is illustrated in FIG. 7. Like the second embodiment of the present invention, the electrokinetic pumps are also addressed by rows and columns, but the electric drivers 200 and 260 are shared by columns and rows respectively. In this embodiment, there are total of (M+N) electric drivers. The advantage of the embodiment is the reduced number of drivers, thus reducing the complexity in fabrication.

Figure 8:
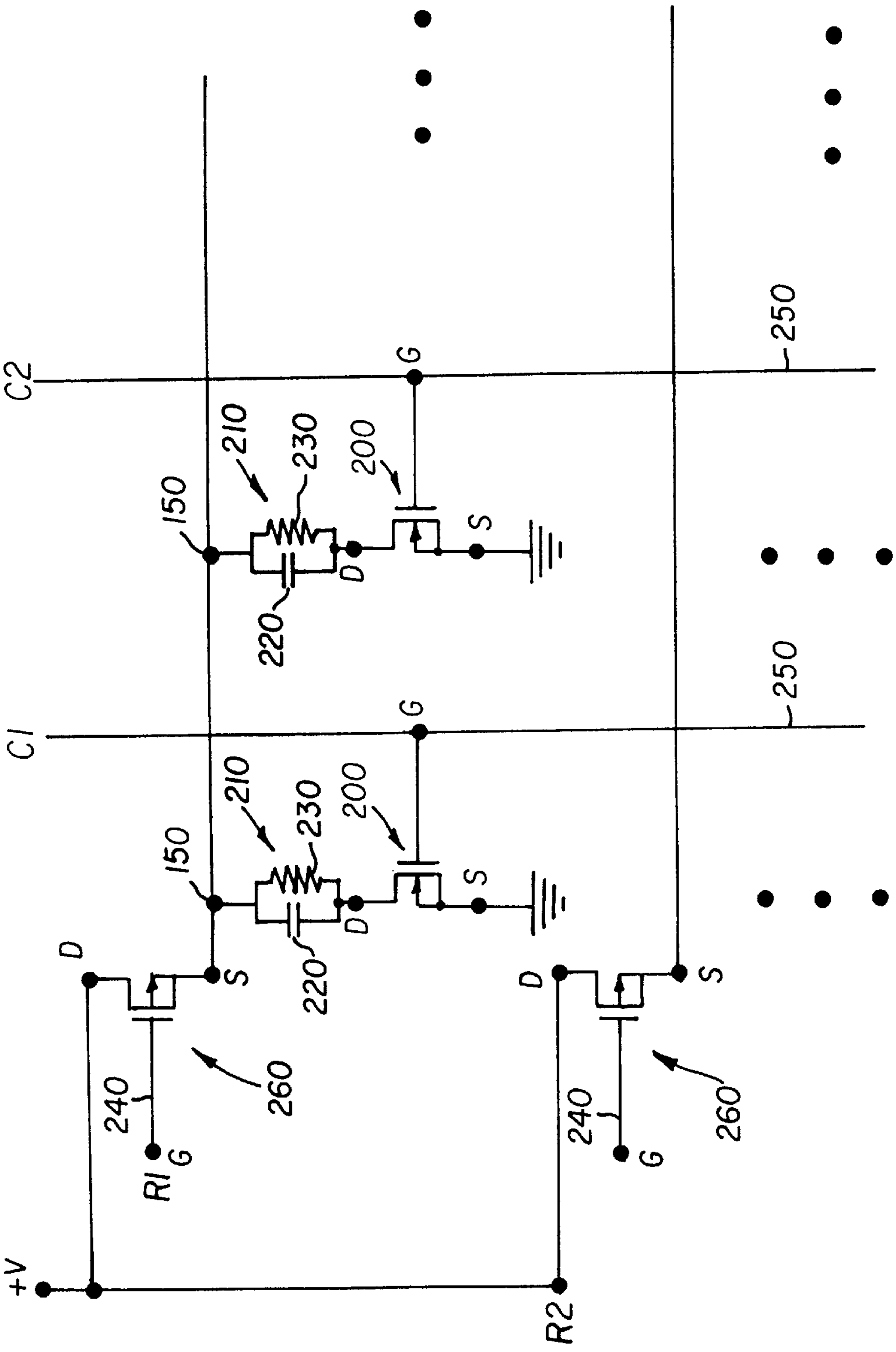
FIG. 8 illustrates the addressing circuit in the fourth embodiment of the present invention.

The fourth embodiment of the addressing circuit in the present invention is illustrated in FIG. 8. This embodiment is a hybrid design of the second and the third embodiments. Whereas the control for electrokinetic pumps in each row share the same electric drivers 260, individual electric drivers are provided for electric drivers 200 in each column. Assuming one electrokinetic pump per colorant delivery chamber, the total number of electric drivers is (M+M×N) and the total number of the conducting wires is (M+N+2). Also, by analogy, the columns can be controlled by common drivers, and each individual driver can be controlled by an individual driver connected to the row signal 240.

It is understood that above embodiments in address circuits can be used for driving for the colorant flow regulators such as microvalves 180 in a microfluidic printing apparatus. The addressing and driving circuit for the colorant flow regulators can be provided in addition to the addressing and driving circuit for the electrokinetic pumps.

The invention has been described in detail with particular reference to certain preferred embodiments thereof, but it will be understood that variations and modifications can be effected within the spirit and scope of the invention.

PARTS LIST

8 microfluidic printing apparatus
10 reservoir for black colorant
20 reservoir for cyan colorant
30 reservoir for magenta colorant
40 reservoir for yellow colorant
50 microchannel
60 colorant delivery chambers
70 electrokinetic pumps
80 receiver
90 microcomputer
95 transport mechanism
120 front plate
130 substrate
140 colorant
150 top electrode
160 lower electrode
170 ground
180 microvalve
185 electrode for microvalve
190 electrode for microvalve
200 electric driver
210 impedance of an electrokinetic pump
220 capacitor
230 resistor
240 row electrodes
250 column electrodes
260 drivers for row control

What is claimed is:

1. A microfluidic printing apparatus responsive to an image file for printing a plurality of pixels on a receiver, comprising:

a) a plurality of colorant delivery chambers;

b) a plurality of channels for delivering colorants to each colorant delivery chamber;

c) a plurality of microfludic pumps wherein a particular microfluidic pump is associated with each channel and effective when actuated for controlling the flow of colorant through the channel to corresponding colorant delivery chambers;

d) first electric drivers each associated with a particular microfluidic pump for actuating its microfluidic pump;

e) a plurality of microvalves wherein a particular microvalve is associated with each channel and effective in a closed position to prevent the flow of colorant and in an open position to permit the flow of colorant;

f) second electric drivers each associated with a particular microvalve for causing its microvalve to move open to close positions; and g) means for operating the first and the second electric drivers for controlling an amount of colorant delivered to each colorant delivering chamber so that colorant is delivered to the receiver when in contact with the delivery chambers.

2. The microfluidic printing apparatus of claim 1 wherein the first and the second electric drivers are field effect transistors (FETs).

3. The microfluidic printing apparatus of claim 1 wherein the first and the second electric drivers are bipolar junction transistors (BJTs).

4. The microfluidic printing apparatus of claim 1 wherein the first and the second electric drivers are a double-diffused metal-oxide semiconductor field effect transistor (DMOSFET).

5. A microfluidic printing apparatus responsive to an image file for printing a plurality of pixels on a receiver, comprising:

a) a plurality of colorant delivery chambers;

b) a plurality of channels for delivering colorants to each colorant delivery chamber;

c) a plurality of microfludic pumps wherein a particular microfluidic pump is associated with each channel and effective when actuated for controlling the flow of colorant through the channel to corresponding colorant delivery chambers;

d) first electric drivers each associated with a particular microfluidic pump for actuating its microfluidic pump;

e) a plurality of microvalves wherein a particular microvalve is associated with each channel and effective in a closed position to prevent the flow of colorant and in an open position to permit the flow of colorant;

f) second electric drivers each associated with a particular microvalve for causing its microvalve to move open to close positions; and g) an electric addressing circuit for selectively addressing the first and the second electric drivers to operate microvalves and the microfluidic pumps to control the flow of colorant delivery to the colorant delivery chambers so that colorant is delivered to the receiver when in contact with the delivery chambers.

6. The apparatus of claim 5 wherein the electric addressing circuit includes rows and columns of the first and the second electric drivers.

7. The apparatus of claim 5 wherein each row or column of the microfluidic pumps is operated by a single first electric driver.

8. The apparatus of claim 5 wherein each row or column of the microvalves is operated by a single second electric driver.

* * * * *